Jan. 24, 1961 D. R. TAIT 2,969,424

COLOR TELEVISION CAMERA COLOR BALANCE APPARATUS

Filed Sept. 25, 1956 2 Sheets-Sheet 1

Inventor
D. R. Tait
By Glascock Downing & Seebold
Attys.

Jan. 24, 1961 D. R. TAIT 2,969,424

COLOR TELEVISION CAMERA COLOR BALANCE APPARATUS

Filed Sept. 25, 1956 2 Sheets-Sheet 2

Inventor
D. R. Tait
By Glascock Downing & Seebold
Attys.

United States Patent Office 2,969,424

Patented Jan. 24, 1961

2,969,424

COLOR TELEVISION CAMERA COLOR BALANCE APPARATUS

David Russell Tait, Ealing, London, England, assignor to Electric & Musical Industries Limited, Hayes, Middlesex, England, a company of Great Britain Filed Sept. 25, 1956, Ser. No. 611,955

Claims priority, application Great Britain Sept. 29, 1955

8 Claims. (Cl. 178—5.4)

This invention relates to color television apparatus in particular to apparatus embodying color television cameras comprising a plurality of pick-up tubes, referred to as multi-tube cameras, or means for converting color television signal standards, for example converting frame sequential color television signals to simultaneous signals by means of a so-called chromacoder.

Multi-tube cameras produce serious chromaticity errors as a result of random variations in sensitivity across the pick-up surfaces in the individual pick-up tubes of such a camera. These errors are particularly noticeable in unsaturated colors where an accurate balance is required between the primary color components representing a particular unsaturated color to give satisfactory reproduction of the original color.

Errors of the type mentioned in the previous paragraph may occur in other forms of apparatus concerned with color reproduction which also comprise a plurality of pick-up tubes, for example the so-called chromacoder mentioned in the introductory paragraph. In the chromacoder frame sequential color television signals are stored on a plurality of targets, one for each of the color components of the sequence, for example, three targets for signals comprising a sequence of red, green and blue components, these targets being scanned to produce simultaneous color television signals which may be affected by chromaticity errors as previously described.

The object of the present invention is to provide a means of substantially reducing errors of the above type.

According to the present invention there is provided color television apparatus comprising at least two component signal channels each including an image pick-up tube, means for applying a representation of a first color component of a scene to the pick-up tube in a first of said channels, means for applying a representation of said first color component and a representation of a second color component of the scene to the pick-up tube in a second of said channels, said tubes being responsive to the applied representations to produce corresponding electrical signals, and means responsive to the difference between the signals corresponding to said first color component produced respectively by said tubes for modifying the transmission of one at least of said channels to improve the color balance of said channels.

Figure 1:
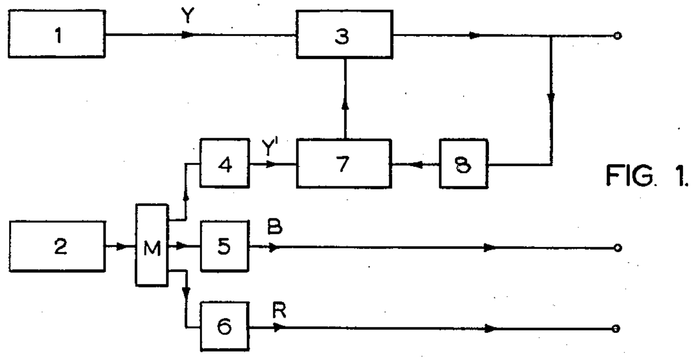
Figure 1A:
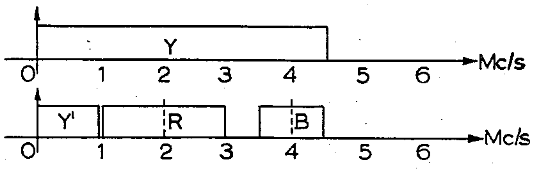
Figure 2:
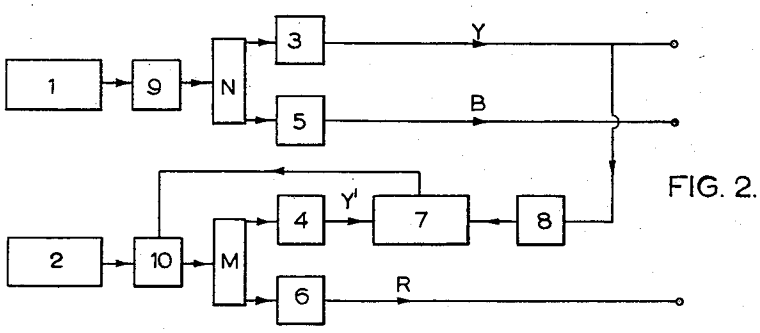
Figure 2A:
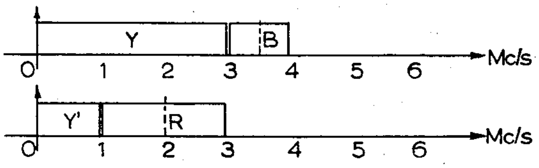

In order that the invention may be clearly understood and readily carried into effect, the invention will be described with reference to the accompanying drawings, in which:

Figure 1 illustrates in block form a two-tube camera according to the present invention, Figure 1A illustrates diagrammatically the bandwidth allocation of signals in the camera of Figure 1, Figure 2 illustrates in block form another two-tube camera according to the present invention, Figure 2A illustrates diagrammatically the bandwidth allocation of signals in the camera of Figure 2.

Figure 3:
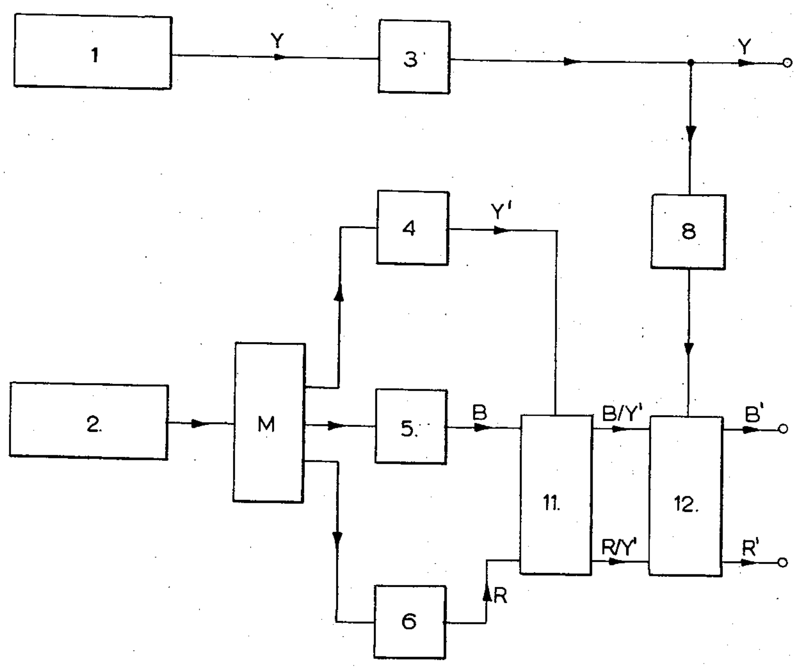

Reference will also be made to the single figure of the accompanying drawing, for convenience sake referred to as Figure 3, which illustrates a further two-tube camera according to the present invention.

In the examples illustrated by Figures 1 and 2 the signal representing the common information derived from one pick-up tube is used in conjunction with a corresponding signal derived from another pick-up tube to provide an error signal to control the gain of a channel amplifying the signal from said first-mentioned pick-up tube in such a way as to counteract the effects of the sensitivity changes on the color balance of the output signals.

Since the sensitivity variations in practical pick-up tubes are gradual, the bandwidth allocated to the monitoring signal may be quite small.

In the example according to the present invention shown by Figure 1, a two tube camera is considered. The pick-up tube 1 provides a high definition signal Y representative of brightness and the pick-up tube 2 provides a low definition signal Y′ representative of brightness occupying the video band and, on separate carriers above it, two color signals R and B representative of the red and blue components, respectively. A matrix M is provided to derive the desired individual output signals from the mixed signal-output of the camera 2, and if required the matrix can be arranged to feed some fraction of the rectified subcarrier signals with negative phase to the Y′ output to reduce errors in the Y′ output due to the non-linearity in the pick-up channels, which may tend to cause the Y′ output to be different in green. The carriers for the color signals R and B may be produced by the methods described in copending United States patent application Serial Number 529,299, now Patent No. 2,866,847, or alternatively such carriers may be derived by means of finely divided gratings in front of the pick-up tubes. In both cases the carriers result from the fact that the charge image produced by the corresponding components of the scene are divided into lines, the spacing of which is one factor determining the carrier frequency. Comparison in the difference amplifier 7 of the low definition brightness signal Y′, from the pick-up tube 2 via amplifier 4, and the output Y of pick-up tube 1 passed through a suitable low pass filter 8 will provide an error signal with which to control the gain of the amplifier 3 so as to maintain a fixed ratio between the low frequency components of the two brightness signals. Blocks 5 and 6 represent amplifiers for the blue and red color component signals, respectively, and serve a similar purpose to amplifier 4. Thus as R, Y′ and B are derived from the same pick-up tube and hence are in correct color balance, Y is also in correct color balance with R and B. The resulting picture will suffer only from brightness errors due to sensitivity changes in the pick-up tube 2 and will be free from color errors. Since the units 1 to 8 may have constructions which are well known in the art, they are represented merely in block form.

Figure 1A illustrates diagrammatically the bandwidth allocations of the signals Y, R, Y′ and B in the camera of Figure 1.

A further example according to the present invention is shown by Figure 2. The pick-up tube 1 provides a high definition signal Y representative of brightness and a color signal B, representative of the blue component, on a carrier. The pick-up tube 2 provides a low definition signal Y′ representative of brightness and a color signal R, representative of the red color component, on a carrier. Matrices M and N serve a similar purpose to matrix M of Figure 1. The Y signal is passed through a low pass filter 8 and is compared with Y′ in a difference amplifier 7, as in Figure 1, which amplifier 7 provides an error signal to gain control the output amplifier 10 of pick-up tube 2 so as to maintain a fixed ratio between the low frequency components of the two brightness signals. Thus R, Y and B are maintained in correct color balance. Amplifiers 3, 4, 5 and 6 are similar to those in Figure 1 and 9 represents an amplifier similar to 10, but not gain-controlled.

Figure 2A illustrates diagrammatically the bandwidth allocations of the signals Y, R, Y′ and B in the camera of Figure 2.

Another means of representing the difference between the signals representing common information derived from two pick-up tubes, say, is by the ratio of the signals. Figure 3 illustrates a two-tube camera employing this representation of the differences between the signals Y and Y′ derived from pick-up tubes 1 and 2, respectively, the latter signal being derived together with the signals B and R, as in Figure 1, via a matrix M and amplifiers 4, 5 and 6. The signals Y′, B and R are passed from their respective amplifiers to a dividing circuit 11 which has two outputs $B/Y'$ and $R/Y'$. These latter signals are fed to a multiplier circuit 12 together with the output of low pass filter 8 connected to pick-up tube 1 via amplifier 3, the outputs derived from multiplier 12 being $B'=BY/Y'$ and $R'=RY/Y'$, which together with the Y signal output from amplifier 3 form the output signals of the camera.

The signals B and R may alternatively be divided by a suitable linear combination of the signals B, R and G (G being representative of the green component) if pick-up tube 2 is employed to derive these latter signals.

It will be appreciated that in Figure 3, if the sensitivities of the pick-up tubes 1 and 2 are the same, $Y/Y'$ will be unity and B′ and R′ will be the same as B and R. On the other hand if the sensitivities of the pick-up tubes 1 and 2 are different, $Y/Y'$ will not be unity, and the signals B and R will be modified as B′ and R′ to restore color balance. Obviously Y and Y′ must be confined to the same frequency range if they are not initially so.

The divider 11 and multiplier 12 may be of any suitable constructions. Suitable constructions are, for example, described in co-pending British patent application No. 25,588/56. In some cases the multiplier 12 may be located at color television receivers.

A camera according to the present invention gives a picture having substantially the inherent color balance of a single tube camera and, at the same time, the high definition and high signal-to-noise ratios in the individual signals of a multi-tube camera.

Clearly the invention may also be applied to means for converting color television standards, for example the chromacoder described briefly above, in which a correct balance of color component television signals may be disturbed by variations in sensitvity across the targets of the pick-up tubes employed in such a means.

The invention as applied to the chromacoder may be carried into practice in the same way as described with reference to Figures 1, 2 and 3, in which case the components denoted by 1 and 2 may represent the pick-up tubes for deriving signals from respective display tubes, as described for example in "British Kinematography," volume 26, No. 1. Moreover, the pick-up tubes are not necessarily of the kind which are exposed to a light image directly; they may be of the kind to which information is applied by "writing" on a charge storage electrode by an electron beam.

Also the invention may be applied to arrangements having three pick-up tubes for deriving Y, R, B or G, R, B signals respectively (G having the usual significance). In this case, the R and B pick-up tubes may each be arranged to provide a low definition Y or G signal (as the case may be) which is employed to control the gain of the R or B channel respectively, as described say with reference to Figure 2.

In the following claims the expression "color component" has been used in a general sense and is intended to mean a component of a single color and also a component of mixed colors. Therefore, unless the context otherwise required, the expression may denote the Y or other similar component of a scene composed of mixed colors in such a way as to represent the brightness of the scene.

What I claim is:

1. Color television apparatus comprising at least two component signal channels each including an image pick-up tube having a target surface, means for applying a representation of a first color component of a scene to the target surface of the pick-up tube in a first of said channels, means for applying a representation of said first color component and a representation of a second color component of the scene to the target surface of the pick-up tube in a second of said channels, said latter means including means for dividing the applied representation of one of said color components into a plurality of lines, said tubes having means for scanning the respective target surfaces to produce electrical signals corresponding to the applied representation with the signal corresponding to said divided representation comprising a modulated carrier wave in a different frequency band from the signal corresponding to the other representation applied to the same tube, means for separating said modulated carrier wave signal from the other signal derived from the same tube, and means for deriving from said modulated carrier wave signal a signal corresponding to the respective color component before division into said plurality of lines, and means responsive to the difference between corresponding components of the signals, corresponding to said first color component produced respectively from said tubes for varying the gain of one at least of said channels to improve the color balance of said channels.

2. Color television apparatus comprising at least two component signal channels each including an image pick-up tube having a target surface, means for applying a representation of a first color component of a scene to the target surface of the pick-up tube in a first of said channels, means for applying a representation of said first color component together with a representation of a second color component of the scene to the target surface of the pick-up tube in a second of said channels, said latter means including means for dividing the applied representation of said second color component into a plurality of lines, said tubes having means for scanning the respective target surfaces to produce electrical signals corresponding to the applied representations with the signal corresponding to said divided representation comprising a modulated carrier wave in a different frequency band from the signal corresponding to the other representation applied to the same tube, filter means for separating the modulated carrier wave signal from the other signal derived from the said second channel tube, and means responsive to the difference between corresponding components of the signals corresponding to said first color component produced respectively from said tubes for varying the gain of one at least of said channels to improve the color balance of the channels.

3. Color television apparatus according to claim 2, said last mentioned means including means for comparing corresponding components of the signals corresponding to said first color component produced respectively from said tubes to derive a difference signal, an amplifier for the signal corresponding to said first color component produced from the pick-up tube in said first channel, and means for varying the gain of said amplifier in response to said difference signal.

4. Color television apparatus according to claim 2, said last mentioned means including means for comparing corresponding components of the signals corresponding to said first color component produced respectively from said pick-up tubes to derive a difference signal, an amplifier before said filter means for amplifying the signals produced from the pick-up tube in said second channel, and means for varying the gain of said amplifier in response to said difference signal.

5. Color television apparatus comprising at least two component signal channels each including an image pick-up tube having a target surface, means for applying a representation of the brightness component of a scene to the target surfaces of the pick-up tube in one of said channels, means for applying a representation of said brightness component and a representation of a color component of the scene to the target surfaces of the pick-up tube in a second of said channels, said latter means including means for dividing the applied representation of one of said color components into a plurality of lines, said tubes having means for scanning the respective target surfaces to produce electrical signals corresponding to the applied representation with the signal corresponding to said divided representation comprising a modulated carrier wave signal in a different frequency band from the signal corresponding to the other representation applied to the same tube, means for separating the modulated carrier wave signal from the other signal derived from the same tube, and means for deriving from said modulated carrier wave signal a signal corresponding to the respective color before division thereof into said lines, and means responsive to the difference between the corresponding components of signals corresponding to the brightness component produced respectively from said tubes for varying the gain of one at least of said channels to improve the color balance of the channels.

6. Color television apparatus comprising at least two component signal channels each including an image pick-up tube having a target surface, means for applying a high definition representation of a first color component of a scene to the target surfaces of the pick-up tube in a first of said channels, means for applying a low definition representation of said first color component and a representation of a second color component of the same scene to the target surfaces of the pick-up tube in a second of said channels, said latter means including means for dividing the applied representation of said second color component into a plurality of lines, said tubes having means for scanning respective target surfaces to produce electrical signals corresponding to the applied representation with the signal corresponding to said divided representation comprising a modulated carrier wave in a different frequency band from the signal corresponding to the said low definition representation applied to the same tube, means for separating said modulated carrier wave signal from the other signal derived from the same tube, means for restricting the bandwidth of a signal corresponding to said high definition representation of said first color component to that of the signal corresponding to the low definition representation thereof, and means responsive to the difference between said bandwidth-restricted signal and said other signal corresponding to said first color component for varying the gain of one at least of said channels to improve the color balance of said channels.

7. Color television apparatus comprising at least two component signal channels each including a pick-up tube having a target surface, means for applying a high definition representation of the brightness component of a scene to the target surfaces of the pick-up tube in the first of said channels, means for applying a low definition representation of said brightness component and a representation of a color component of the scene to the target surfaces of the pick-up tube in the second of said channels, said latter means including means for dividing the applied representation of said color component into a plurality of lines, said tube having means for scanning the respective target surfaces to produce electrical signals corresponding to the applied representations with the signal corresponding to said color component comprising a modulated carrier wave in a different frequency band from the signal corresponding to said low definition brightness component, filter means for separating said modulated carrier wave signal from the other signal derived from the same tube, means for deriving from said modulated carrier wave signal a signal corresponding to said color component before division thereof into said lines, means for restricting the bandwidth of a signal corresponding to said high definition representation of said brightness component to that of the signal corresponding to the low definition representation thereof, means for comparing said band restricted signal and said signal corresponding to the low definition brightness component to derive a difference signal, an amplifier for amplifying said signal corresponding to said color component before division thereof into lines, and means for controlling the gain of said amplifier in response to said difference signal to improve the color balance of said channels.

8. Color television apparatus comprising at least two component signal channels each including a pick-up tube having a target surface, means for applying a representation of a first color component of a scene to the target surface of the pick-up tube in the first of said channels, means for applying a representation of said first color component and a representation of a second color component of the scene to the target surface of the pick-up tube in the second of said channels, said latter means including means for dividing the applied representation into a plurality of lines, said tubes having means for scanning the respective target surface to produce electrical signals corresponding to the applied representations with the signal corresponding to said divided representation comprising a modulated carrier wave in a different frequency band from the signal corresponding to the other representation applied to the same tube, means for separating said modulated carrier wave signal from the other signal derived from the same tube, means for deriving from said modulated carrier wave signal a signal corresponding to said second color component before division thereof into lines, an amplifier for said last mentioned signal, and means for varying the gain of said amplifier in response to the ratio of corresponding components of the signals corresponding to said first color component produced respectively from said pick-up tubes, to improve the color balance of said channels.

References Cited in the file of this patent

UNITED STATES PATENTS

| | | |
|---|---|---|
| 2,378,547 | Graham | June 19, 1945 |
| 2,710,889 | Tobias | June 14, 1955 |
| 2,716,151 | Smith | Aug. 23, 1955 |
| 2,721,892 | Yule | Oct. 25, 1955 |
| 2,736,761 | Sziklai | Feb. 28, 1956 |
| 2,761,007 | Fisher | Aug. 28, 1956 |
| 2,773,116 | Chatten | Dec. 4, 1956 |